July 17, 1956  C. J. MALHIOT  2,754,980
PACKAGE STACKING MECHANISM
Filed May 20, 1950  3 Sheets-Sheet 1
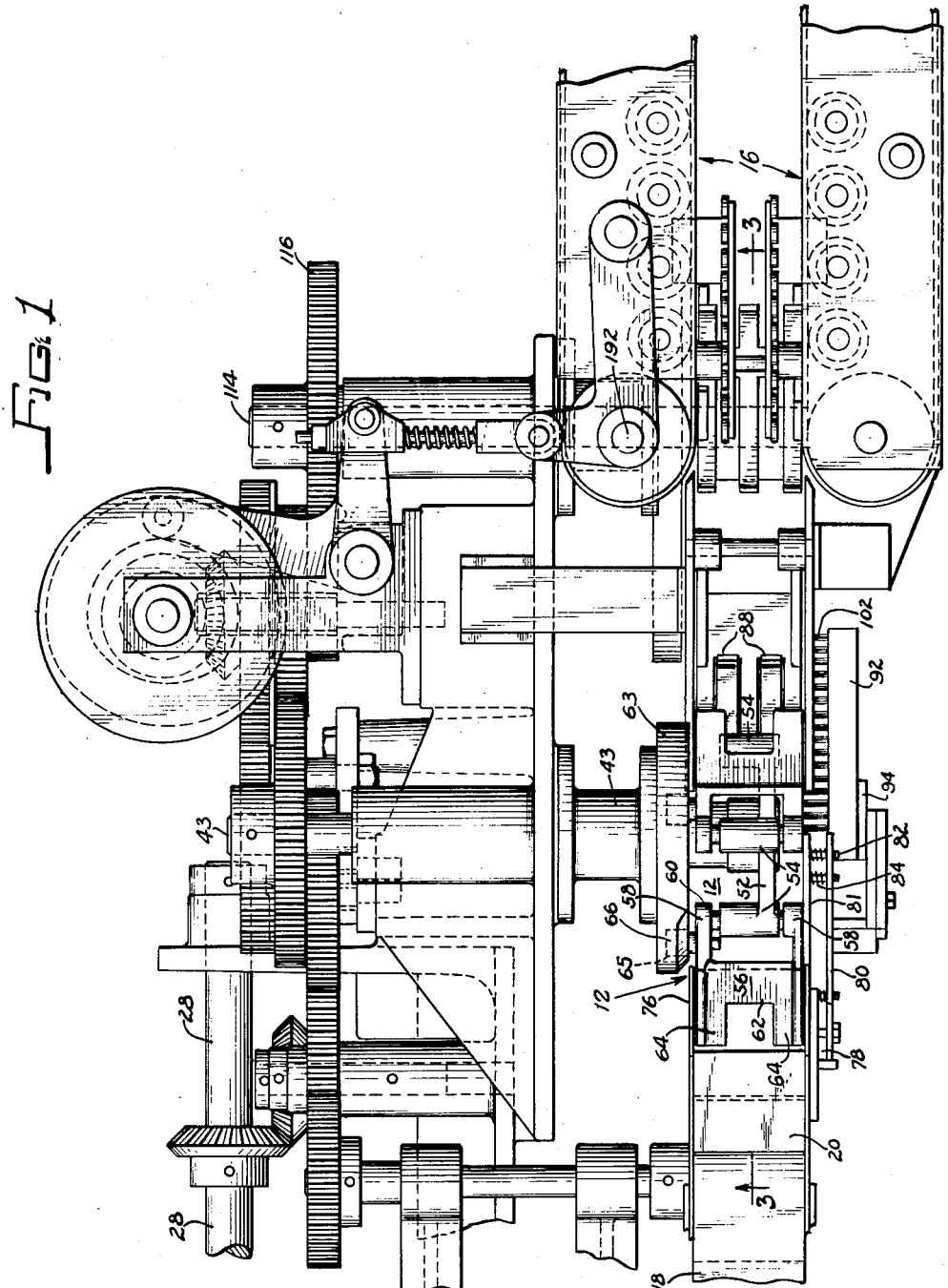
INVENTOR.
Clarence J. Malhiot
BY
Spencer, Johnston, Cook & Root
Attys.

July 17, 1956  C. J. MALHIOT  2,754,980
PACKAGE STACKING MECHANISM
Filed May 20, 1950  3 Sheets-Sheet 2
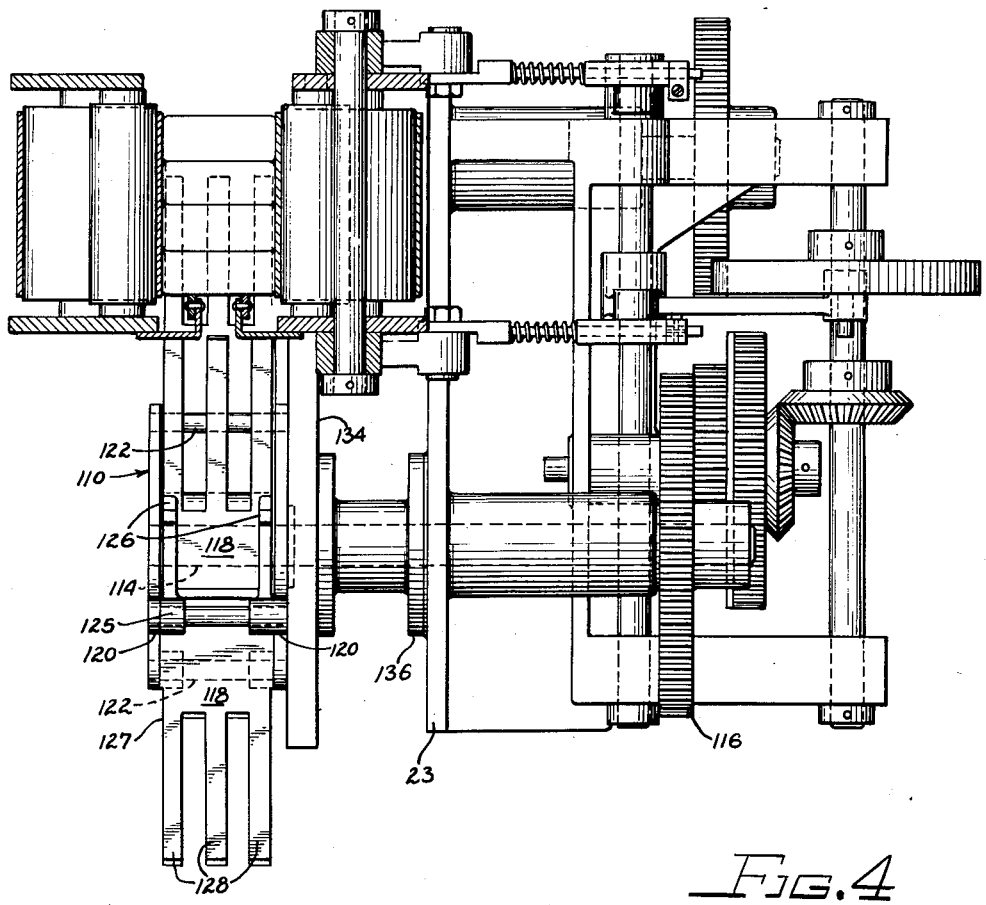
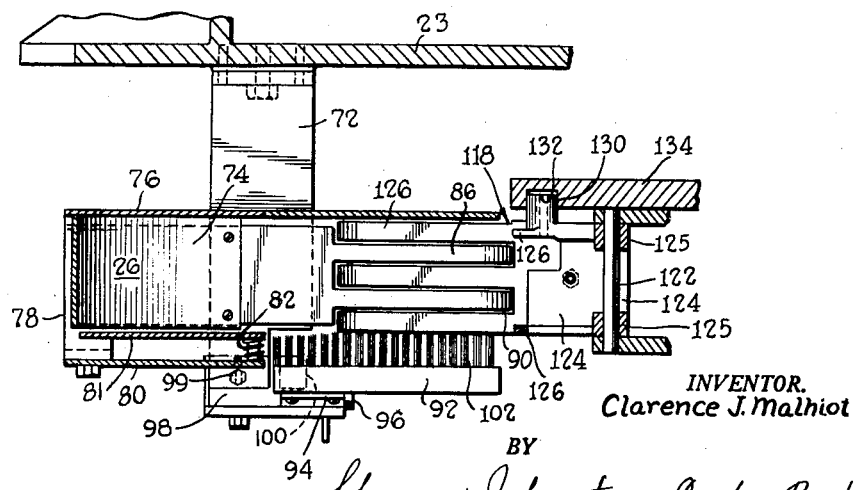
INVENTOR.
Clarence J. Malhiot
BY
Spencer, Johnston, Cook & Root
Attys.

July 17, 1956 — C. J. MALHIOT — 2,754,980
PACKAGE STACKING MECHANISM
Filed May 20, 1950 — 3 Sheets-Sheet 3

INVENTOR.
Clarence J. Malhiot
BY Spencer, Johnston,
Cook & Root
attys.

United States Patent Office 2,754,980
Patented July 17, 1956

2,754,980

PACKAGE STACKING MECHANISM

Clarence J. Malhiot, Oak Park, Ill., assignor to F. B. Redington Co., Chicago, Ill., a corporation of Delaware Application May 20, 1950, Serial No. 163,248

4 Claims. (Cl. 214—6)

The present invention relates to improvements in package stacking mechanism adapted for use in receiving wrapped packages from the delivery end of a wrapping machine for the purpose of stacking the packages one on top of the other.

The primary object of the present invention consists in the provision of new and improved means for transferring articles as they are fed in edge-to-edge relationship to a transfer mechanism, to remove the packages from the conveyor and shift them in position in a chute in side-by-side relationship for elevation by a further transfer mechanism to pick up a plurality of packages and arrange them in vertically stacked tiers so as to facilitate loading of the articles or packages into shipping containers of numerically equal groups of superimposed packages.

Another object of the invention is to provide an apparatus in which the stacking operation of packages may be varied to accommodate the grouping of different numbers of packages in the stacks successively delivered from the wrapping machine to a discharge position, such as to a drying channel, while maintaining a numerically equal number of packages in each successive group.

A further object of the invention is to provide a new and improved device for taking articles from a straight line conveyor, stacking them, and delivering the stacks to another conveyor moving in the same line and direction as the first conveyor.

Numerous other objects and advantages will be apparent throughout the progress of the specification which follows.

The accompanying drawings illustrate a selected embodiment of the invention and the views therein are as follows:

Fig. 1 is a detail plan view of a machine embodying the present invention;

Fig. 2 is a detail transverse sectional view;

Fig. 4 is a detail sectional view through the delivery chute and the stacking transfer wheel.

Figure 3:
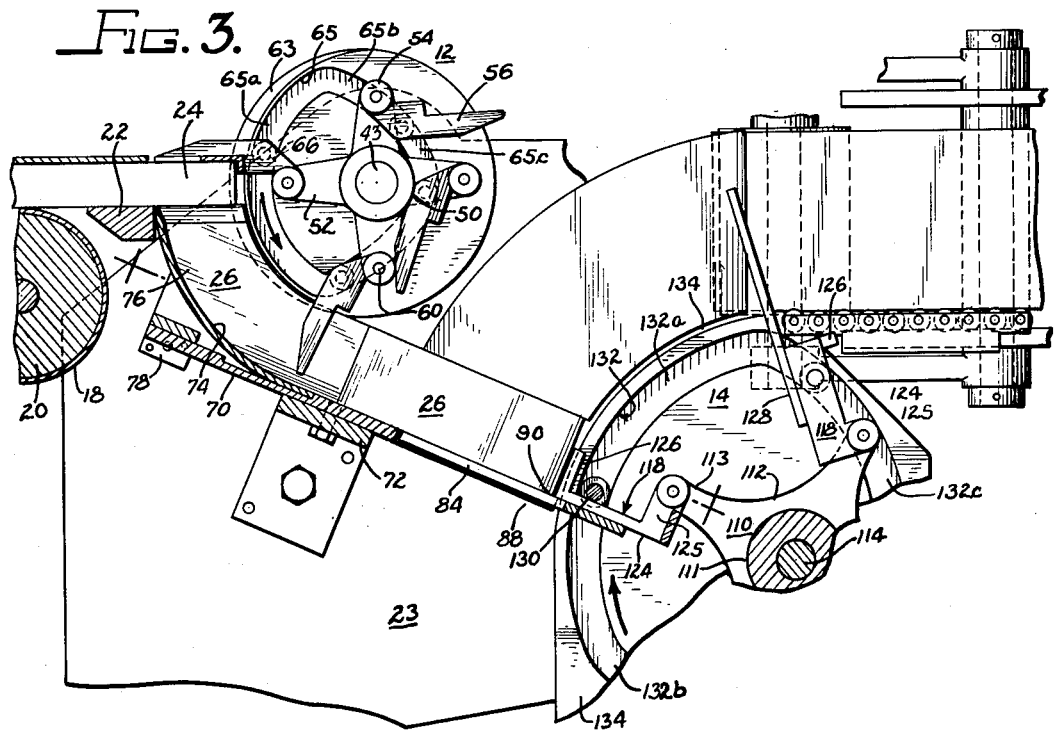
Fig. 3 is a sectional view taken substantially along the line 3—3 of Fig. 1.

The stacking machine is shown as being operatively connected to the discharge end 10 of a conveyor for a wrapping machine from which wrapped and unsealed packages emerge. The partially wrapped packages are delivered successively under the influence of a rotating impeller device, which has been designated in its entirety at 12, to a stacking and transfer device generally indicated at 14, Fig. 3, which operates, upon reception of a predetermined number of the packages, to transfer them in stacked condition to a sealing or drying mechanism generally designated at 16 in the form of a drying conveyor assembly by means of which the flaps are pressed for sealing purposes, and the stacked and sealed packages delivered for further packaging in shipping containers.

Only the delivery end 10 of the wrapping machine has been disclosed and this machine includes an endless conveyor belt 18 which passes over a driving pulley 20 and which delivers the wrapped articles successively onto a shelf 22 (see Fig. 3) forming a part of the sealing and stacking machine framework 23. From the shelf 22 the packages are moved by the follow-up action of successive packages between a pair of side rails 24 to a position overlying the open upper end of a curved chute or guide assembly 26 (see also Fig. 4) which is suitably supported from a stationary part of the machine framework 23 and which constitutes a group forming support for the packages as will presently appear.

The operative moving parts of the sealing and stacking machine comprising the present invention are adapted to be driven from a common driving shaft 28 (see particularly Fig. 1) which also serves to drive the conveyor belt 18 leading from the wrapping machine and thus the movements of the conveyor belt, and consequently the feeding at least of the semi-packaged articles is in timed relation with the operational movements of the stacking machine. The drive shaft 28 serves at all times to drive the pulley 20 of the wrapping machine discharge conveyor.

The rotary impeller device 12 includes an impeller shaft 43 rotatably journalled in the machine framework 23. The impeller shaft 43 carries an impeller wheel 50 of generally star-shape design and having a plurality of radially extending arms 52, each of which is formed with a sleeve or hub portion 54, Fig. 3, at its outer end to which there is pivoted an individual impeller member 56.

Each impeller member 56 is in the form of a plate-like member having a pair of ears 58, Fig. 1, pivotally mounted on a pivot pin 60 extending through the hub or sleeve 54, a web portion 62, and a pair of package engaging fingers 64. The impeller members 56 are adapted upon continuous rotation of the impeller wheel 50 to successively engage the packages at the entrance to the chute assembly 26 and to forcibly eject the same from their positions between the side rails 24 and impel the same downwardly into the chute assembly 26 for the purpose of assembling numerically equal groups of the packages within the chute, Fig. 4, for subsequent transfer of the groups bodily and successively to the sealing and drying instrumentalities of the machine.

Cam means are provided for controlling the movements of the impeller members 56 upon rotation of the impeller wheel 50 so as to advance the fingers 64 thereof squarely into engagement with a package at the entrance to the chute assembly 26, and to cause them to dislodge each package from its position between the side rails 24, as well as to cause the impeller members 56 to become retracted after they have advanced the package an appreciable distance along the length of the chute assembly 26.

Toward this end a stationary cam plate 63, Figs. 1 and 3, surrounds the shaft 43 and is secured in any suitable manner to the framework 23 of the machine, and has formed therein a continuous cam groove 65, Fig. 3. Each of the impeller members 56 has a cam roller 66, Fig. 3, mounted thereon extending into the groove 65 and adapted to travel continuously therearound during rotation of the impeller wheel 50. The shape or contour of the cam groove 65 is designed according to engineering exigencies in such a manner that it possesses a circular arcuate region 65a, Fig. 3, of relatively great eccentricity which drops off sharply as at 65b into a region 65c of relatively small eccentricity. The net effect of the cam groove 65 upon the impeller members 56 is to cause them to be projected outwardly from the central regions of the impeller wheel 50 as the roller 66 enters the region 65a so that they will squarely engage the packages which are poised at the entrance to the chute assembly 26 and dislodge them from the conveyor 10 and impel them forwardly and downwardly into the chute assembly 26, as well as to cause the impeller members 56 to be retracted into the central regions of the impeller wheel 50 as the roller or follower 66 enters the region 65c and thus withdraw them from engagement with the packages which assume a nested condition in the chute assembly 26 preparatory to being upended bodily and transferred to the sealing instrumentalities or drying conveyor assembly 16 in the form of a vertical stack.

The chute assembly 26 is shown in detail in Figs. 3 and 4, and involves in its general organization a flat supporting or bottom plate 70 (see Fig. 3) suitably secured to a transverse supporting bracket 72 which extends across the machine framework 23. The chute assembly further comprises a curved bottom guide plate 74 leading from the chute entrance and a fixed side wall 76, Fig. 4. A crosspiece 78 secured to the side wall 76 extends beneath the plate 70 and has secured thereto a fixed outer wall or plate 80 (see also Fig. 1), on which there is mounted a floating side wall 81 supported on pins 82 and yieldably maintained against outward displacement by means of compression springs 84 surrounding the pins 82.

The lower end region of the bottom plate 70 of the chute assembly 26 is cut away as at 85, Fig. 4, to provide a plurality of downwardly inclined supporting fingers 86 upon which the various packages which cooperate to make up a stack are adapted to come to rest as each stack is being assembled in the chute preparatory to the transfer of the stack to the drying or sealing conveyor 16. While any number of fingers may be provided, two such fingers have been found adequate and these fingers are spaced apart so as to give proper support to the various packages undergoing assembly when the lifting or transfer operation takes place.

A pair of package stops 88, Fig. 1, are suitably secured to the lower ends of the fingers 86 and have laterally turned ends 90, Fig. 3, which project upwardly into the path of movement of the packages and determine the position of the first package in each stack as the stack is progressively accumulated in the chute assembly 26.

In order to align the various packages against the fixed side wall 76, Figs. 1 and 4, as they accumulate in the chute assembly 26, a brush assembly 92 is secured to a brush holder 94, the lower end of which is mounted on a pin 96 which projects outwardly from a supporting bracket 98, Fig. 4 adjustably mounted on the transverse bracket 72 and adjustable thereon by a pin and slot mechanism 99. The brush assembly 92 includes a plurality of bristles 102, the ends of which are aligned and which are mounted with their free ends in substantial alignment with the yieldable side wall 81, the function of the bristles being to lightly and frictionally engage the ends of the packages and align them against the fixed side wall 76, as well as to wipe a glued flap and hold the same until such time as the stack, consisting of the prerequisite number of packages, has been accumulated in the chute assembly 26 and its transfer by the transfer device 14 to the drying conveyor assembly 16 has been effected.

The stacking and transfer device 14 includes a stacking and transfer wheel 110, Fig. 3, of generally spool-shape design and including a central hub portion 111 and radially extending spool sides 112 providing radially extending arms 113 which are arranged in opposed pairs and of which there are preferably four in number at each side of the stacking wheel. The stacking and transfer wheel 110 is mounted upon and secured to a shaft 114 which extends across the machine framework 23, Fig. 2, and which carries thereon a stacking wheel driving gear 116, Fig. 1, capable of being driven at different speed ratios from the driving shaft 28.

Referring now to Figs. 2, 3 and 4, a plurality of lifting or stacking arm assemblies 118 are pivotally mounted between the opposed ends of each pair of arms 113 and toward this end a boss 120, Fig. 2, is formed on the end of each arm and a pivot pin 122 extends across and has its ends supported in each pair of aligned bosses. Each stacking arm assembly 118 includes a block portion 124, Fig. 4, formed with a pair of spaced upstanding bosses 125 which surround the pivot pin 122 and from which there extends upwardly a pair of spaced package supporting arms 126, Figs. 3 and 4. A fork-like lifting plate 127, Fig. 2, having a series of lifting fingers 128, of which there are preferably three in number, is secured in any suitable manner, as, for example, by welding, to a surface of each block portion and is designed for register with the cutaway portions 85 formed in the supporting plate 70 of the conveyor assembly 26. Each block portion 124 carries a cam follower roller 130 adapted to travel in a continuous cam groove 132, Figs. 3 and 4, formed in a cam plate 134 secured to a supporting member 136, Fig. 2, which, in turn, is secured to a stationary part of the machine framework 23.

The cam groove 132 is designed in such a manner that the stacking arm assemblies 118 are projected outwardly from the central regions of the stacking wheel 110 a sufficient distance that they may underlie and receive thereon the sides of a definite predetermined number of close-lying leading packages contained in the chute assembly 26 in the bottom regions thereof. In the present instance, the extent of the lifting fingers 128 is such that they may underlie and receive thereon four of the close-lying leading packages contained within the chute assembly. As the stacking wheel 110 is rotated in a clockwise direction, as viewed in Fig. 3, the lifting fingers 128 pass through the cutaway portions 85, Fig. 4, in the supporting plate 70, Fig. 3, and engage the underneath sides of the four lowermost packages resting in the chute assembly 26 and lift them bodily upwardly to upend them as a unit or stack and transfer them in stacked condition to the drying or sealing mechanism 16. During the actual transfer operation as described above, one side of the lowermost package in the group or stack rests by gravity on the two package supporting arms 126 which assume horizontal positions as they approach the sealing mechanism so that the stacks are deposited in substantially vertical position on the supporting surface provided for their reception at the sealing mechanism.

After the stacks of four packages each have been transferred to the sealing mechanism 16 as described above, the lifting arm assemblies 118 are rapidly withdrawn under the influence of the cam follower rollers 130 and groove 132 and swung out of the path of movement of the stacked articles in the drying mechanism so that they do not interfere with the normal movement thereof through the mechanism. Accordingly, the cam groove 132 is provided with a substantially circular arcuate portion 132a, Fig. 3, of comparatively great eccentricity which drops off sharply at 132b on either side thereof to a region of comparatively small eccentricity 132c. As each cam roller or follower 130 enters the arcuate portion 132a of the cam groove 132, its respective lifting arm assembly 118 becomes extended as previously described so that it may underlie and engage a group or stack of the packages in the chute assembly 26. As the roller or follower 130 enters the region 132b, the follower is drawn rapidly inwardly of the stacking wheel 110 and the lifting assembly 118 is moved rapidly to its retracted position as clearly illustrated in Fig. 3.

As will be pointed out presently, the movements of the stacking and transfer wheel 110 are synchronized with the feed of the packages into the chute assembly 26 and toward this end the previously mentioned stacking wheel driving gear 116, Fig. 1, is adapted to be driven from the same driving shaft 28 which controls the movements of the package feeding impeller wheel 50. The driving mechanism for the stacking wheel 110 may be adjusted or shifted through a speed-change mechanism to vary the rate of turning movement of the stacking wheel to vary the number of packages collected or grouped in the chute assembly 26 prior to engagement thereby by the lifting arm assemblies 118 to thus vary the number of packages transferred at one time to the sealing mechanism 16 and to accordingly vary the number of packages in each stack.

The machine has been illustrated in the drawings as being set or adjusted for the transfer of four packages during each successive transfer operation to the drying or sealing mechanism 16, but as will be described presently, it may, by a simple adjustment, be converted to use in the transfer of only three packages to the sealing mechanism during each transfer operation.

It has been described previously how the conveyor belt 18 leading from the wrapping machine, and the impeller device 12 which ejects the packages from the discharge end of the wrapping machine and impels them into the chute assembly 26, are continuously driven in timed relationship from the driving shaft 28. A drive also exists from the driving shaft 28 to the stacking wheel 110 and this drive, as illustrated in Fig. 1, includes a speed-change mechanism for varying the rate of turning movement of the stacking wheel to accommodate varying the number of articles transferred during each transfer operation from the chute assembly 26 to the sealing device 16.

The rate of delivery of the packages at the discharge end of the conveyor belt 18 remains constant and the rate of their ejection or removal therefrom by the impeller device 12 likewise remains constant and is sufficiently high that each package is ejected into the chute assembly 26 at approximately the instant at which it arrives at the impeller device. In this manner the close-lying packages on the belt 18 do not become clogged and there is little, if any, slippage of the packages on the belt by virtue of any delay in ejecting them at the discharge end of the belt.

The timing operation of the stacking wheel through both its high speed and its low speed is likewise predetermined so that there shall be no clogging of the packages in the chute assembly 26 which might "back up," so to speak, into the delivery conveyor of the wrapping machine.

When the machine is set to deliver the packages to the drying channel in stacks of four packages each, the gearing is such that the stacking wheel 110 and the impeller wheel 50 rotate respectively at a one-to-four ratio and the grouped packages are removed by the stacking arm assemblies 118 and are delivered to the drying mechanism 16 four at a time at a rate which, over a given period of time, equals the rate of delivery of the packages from the conveyor belt 18 into the chute assembly 26.

When the machine is set to deliver the packages to the drying channel 16 in stacks of three packages each, the stacking wheel 110 and impeller wheel 50 rotate respectively at a one-to-three ratio with the net result that each time the impeller device 12 ejects three of the packages from the discharge end of the conveyor belt 18 and into the chute assembly 26, the three packages are "picked up," so to speak by one of the oncoming stacking arm assemblies 118 of the stacking wheel 110 and delivered to the drying channel. The timing between the stacking wheel 110 and impeller wheel 50 is such that the next or fourth package delivered into the chute assembly falls to the bottom of the latter against the package supporting arms 126 and becomes the bottom package in the next succeeding stack of three packages delivered to the drying channel. Thus, as in the case of four-package stacks, the chute assembly 26 as well as the discharge end of the conveyor belt 18 are cleared at all times to make room for oncoming packages.

The sealing mechanism is not claimed herein, as the same is being claimed in applicant's copending application, Serial No. 589,440, filed June 5, 1956.

Changes may be made in the form, construction and arrangement of the parts without departing from the spirit of the invention or sacrificing any of its advantages and the right is hereby reserved to make all such changes as fall fairly within the scope of the following claims.

The invention is hereby claimed as follows:

1. Stacking mechanism for stacking packages receivable from a continuous conveyor with the packages arranged in contacting relationship comprising a continuously rotating transfer wheel, spaced arms on said wheel successively engaging successive packages and depositing said packages to a receiving member, means withdrawing each arm inwardly to release a package as the package reaches a position on the receiving member and then projecting the arms for subsequent package transfer from the conveyor when the arm reaches a predetermined position, a second continuously rotating transfer wheel to remove a plurality of packages from the receiving member and arranging said plurality of packages in stacked relation, spaced arms on said second wheel successively engaging a plurality of packages successively on the receiving member and shifting said plurality of packages in stacked relation to discharge position.

2. Stacking mechanism for stacking packages receivable one at a time from a continuous moving conveyor with adjacent packages contacting, comprising a continuously rotating transfer wheel, spaced arms on said wheel successively engaging successive packages and depositing said packages to a certain discharge position, means withdrawing each arm inwardly to release a package as each package reaches a predetermined position in its movement toward said discharge position, means for projecting said arms inwardly for subsequent engagement and transfer of packages from the conveyor when each arm reaches a predetermined position, a second continuously rotating transfer wheel to remove a plurality of packages from said discharge position for arranging said packages in stacked relation, spaced arms on said second wheel successively engaging a plurality of packages successively at said discharge position and for shifting said plurality of packages to a second discharge position in stacked relation, said second transfer wheel comprising projecting arms and means for causing said arms to be shifted inwardly upon a predetermined position of the arms during rotative movement of the second wheel.

3. Stacking mechanism for stacking packages receivable one at a time from a continuous moving conveyor with adjacent packages contacting, comprising a continuously rotating transfer wheel operating in timed relation with said conveyor, spaced arms on said wheel successively engaging successive packages on the conveyor and depositing said packages to a certain discharge position, a cam having a cam way adjacent said wheel, means on the arms engaging the cam way, means to cause projection and retraction of the arms during rotation of the wheel and controlled by said means and cam way, said arms being receded to release a package as the package reaches a predetermined position toward said discharge position, means for projecting said arms outwardly for subsequent engagement and transfer of successive packages from the conveyor when a said arm reaches a predetermined position, a second continuously rotating transfer wheel operating in timed relation with the operation of the first wheel to remove a plurality of packages from said discharge position for arranging said packages in stacked relation, spaced arms on said second wheel successively engaging a plurality of packages successively at said discharge position and shifting said plurality of packages to a second discharge position in stacked relation, means for projecting said arms when said arms arrive at a predetermined position, and means for shifting said arms inwardly when arriving at another predetermined position during rotative movement of said latter transfer wheel.

4. Stacking mechanism for stacking packages receivable one at a time from a continuous moving conveyor with adjacent packages contacting, comprising a continuously rotating transfer wheel operating in timed relation with the conveyor, spaced arms on said wheel successively engaging successive packages on the conveyor and depositing said packages to a certain discharge position, a cam having a cam groove adjacent the wheel, rollers on the arms receivable in the cam groove, said cam groove being constructed and arranged to cause alternate recession and projection of the arm, said arms being receded to release packages as they reach a predetermined position toward said discharge position and projecting outwardly for subsequent engagement and transfer from the conveyor when said arms reach predetermined positions, a second continuously rotating transfer wheel operating in timed relation with the first wheel to remove a plurality of packages from said discharge position and arranging said packages in stacked relation, spaced arms on said second wheel successively engaging a plurality of packages successively at said discharge position and shifting said plurality of packages to a second discharge position in stacked relation, a second cam having a cam groove adjacent the second wheel, rollers on the second arms receivable in said latter cam groove, said second cam groove being constructed and arranged to cause alternate recession and projection of the latter arms, said last named arms projecting outwardly for engaging a plurality of packages when the second arms arrive at a predetermined position and then receding when the arms arrive at another predetermined position during rotative movement of the second wheel.

References Cited in the file of this patent

UNITED STATES PATENTS

| | | |
|---|---|---|
| 1,627,363 | Webster | May 3, 1927 |
| 1,801,696 | Semashko | Apr. 21, 1931 |
| 1,889,846 | Wright | Dec. 6, 1932 |
| 1,961,697 | Little | June 5, 1934 |
| 1,974,931 | Rose | Sept. 25, 1934 |
| 2,050,126 | Rose | Aug. 4, 1936 |
| 2,191,436 | Bell | Feb. 27, 1940 |
| 2,254,291 | Joa | Sept. 2, 1941 |
| 2,345,645 | Wickwire et al. | Apr. 4, 1944 |